United States Patent [19]

Desblanche et al.

[11] 3,890,572

[45] June 17, 1975

[54] METHOD AND APPARATUS FOR EQUALIZING PHASE-MODULATED SIGNALS

[75] Inventors: Andre Eugene Desblanche; Jean Marc Pierret, both of Nice, France

[73] Assignee: International Business Machines Corporation, Armonk, N.Y.

[22] Filed: Jan. 28, 1974

[21] Appl. No.: 437,429

[30] Foreign Application Priority Data

Jan. 31, 1973 France ............................ 73.04200

[52] U.S. Cl. .................. 325/42; 325/320; 325/321

[51] Int. Cl. ............................................ H04l 27/18

[58] Field of Search ................ 325/42, 65, 34, 320; 333/17, 18 R; 328/155

[56] References Cited

UNITED STATES PATENTS

| | | | |
|---|---|---|---|
| 3,755,738 | 8/1973 | Gitlin | 333/18 R X |
| 3,757,221 | 9/1973 | Moehrmann | 325/42 |
| 3,758,861 | 9/1973 | De Jaeger et al. | 325/42 X |

*Primary Examiner*—Benedict V. Safourek
*Attorney, Agent, or Firm*—Edward H. Duffield

[57] ABSTRACT

A method of equalizing a phase modulated signal and apparatus for doing so without a frequency field transfer are disclosed. The input signals are fed through a variable transfer transversal filter for obtaining an equalized signal; an error adjustment signal is generated by comparing the output from the transversal filter with a reference signal at time instants defined by a clock which generates timing signals at the data bit rate. The transfer function of the transversal filter is then adjusted for minimum error. The method of generating the error signal includes steps of extracting the carrier frequency from the received signal; generating from the extracted carrier frequency n possible reference signals, and selecting from said n reference signals the particular one to be used at a given characteristic instant.

12 Claims, 5 Drawing Figures

METHOD AND APPARATUS FOR EQUALIZING PHASE-MODULATED SIGNALS

FIELD OF THE INVENTION

This invention generally relates to systems and their method of operation which eliminate or reduce the distortion which appears on electrical signals used for data transmission. More particularly, this invention relates to a method and apparatus for correcting linear distortions introduced in the data signals transmitted over a communication channel in a data transmission system using the phase modulation technique, said apparatus being referred to as an equalizer.

BACKGROUND OF THE INVENTION

When data signals are transmitted over a communication channel, each signal generates certain components which are distributed in time. Unless these components are eliminated or compensated for, they may interfere with the transmission of one or several successive data signals if the spacing between such signals is less than a critical value. This may result in the data signal being improperly detected by the receiving station. This interference, known as intersymbol interference, is generally due to the characteristics of the channel itself and is aggravated by the noise that is introduced in the channel by external sources whose control presents varying degrees of difficulty.

As the data rate is increased, the problem associated with the linear distortions introduced by the communication channel becomes of paramount importance. To resolve this problem, it has been proposed to use, before detecting the data, a correction device designed to compensate for such distortions. These devices are known as equalizers.

Briefly, an equalizer is a variable transfer function network whose transfer function is adjusted in accordance with an error signal obtained by comparing the equalizer output signal with a reference signal. This network generally includes a transversal or recursive filter. These filters generally consist of several delay elements connected in series, each of which introduce the same delay, several taps connected to the input and to the output of each respective element, and a summing device. Each tap comprises a circuit designed to weight the signal present on that tap. Since the channel characteristics are not known beforehand and may vary in time, it is necessary to enable the equalizer to automatically adapt to the requirements of the particular channel being used; that is to say, to provide for the automatic adjustment of the tap gains to optimum values with respect to a given channel.

PRIOR ART

At the present time, the most commonly used type of equalizer is the automatic transversal filter described in, "Principles of Data Communication," by R. W. Lucky, J. Salz and E. J. Weldon, Jr., published by McGraw-Hill, New York, 1968, pages 128–165. The equalizer described therein is applied to amplitude-modulation systems in which the data signal is transmitted in, or returned to, the baseband before equalization. The error signal is obtained by comparing the amplitudes of the signals received at predetermined reference levels by means of test signals transmitted before the data signals proper.

The same concept has been applied to the transmission of phase-modulated signals: it will be recalled that in phase modulation, the phase of a carrier frequency is varied in accordance with the data to be sent. In the type of phase modulation which is the most widely used at present and is known as phase-shift keying (PSK) modulation, the transmission of digital data is based upon the continuous generation of a carrier frequency whose phase is made to shift at characteristic instants, each shift being representative of a single data element or of a group of data elements. There are two generally recognized methods of demodulation, or detection, in phase modulated systems: the first method is coherent or fixed-reference demodulation, where the resultant phase of the carrier frequency relative to an absolute phase reference directly represents the data element or group of data elements. The second method is differential or comparison demodulation, where the data element or group of data elements is represented by the phase shift relative to the preceding phase. Differential demodulation is preferred in practice as it does not require the use of an absolute phase reference, which is always difficult to obtain upon receiving the signal being transmitted.

The principles described in the aforementioned book by R. W. Lucky et al. have been used for the equalization of phase-modulated signals. It has previously been proposed to regard the PSK technique as the equivalent of an amplitude modulation transmission performed over two channels whose respective carrier frequencies are in quadrature. Thus, the equalization is effected in each channel as described in said book, taking the interaction between the two channels into consideration. It is, of course, necessary before the equalization to demodulate the received signal by means of the two carrier frequencies in quadrature. A more detailed description of this technique may be found in the document entitled CCITT Contribution No. 171, Dec. 1971, Study Group Sp.A.

Such a demodulation is not desirable, at least before the equalization, for a number of reasons. In particular, if it is desired to use digital techniques, this type of demodulation necessitates many analog-to-digital and digital-to-analog conversions because certain operations must be performed on the signal prior to demodulation (for example, any pilot frequencies transmitted along with the data to allow the clock or the carrier frequency to be recovered must be suppressed), while other operations, such as the equalization, are to be carried out after demodulation of the signal.

French Patent application No. 72,01484, filed Jan. 10, 1972, describes several methods which eliminate the need for demodulating the signal before equalizing it. The basic principle taught in said patent application is to equalize the signal in the frequency domain within which it was transmitted; that is, with no modulation or demodulation. On the other hand, the error signal which serves to adjust the equalizer is generated in a different frequency domain, the frequency domain in which a reference signal can most easily be defined being selected.

Thus, the application of said basic principles to a phase-modulation transmission system makes it necessary to answer the following question: how can an error signal controlling the adjustment of the equalizer be obtained at the output of that equalizer. U.S. Pat. application Ser. No. 354,413, filed Apr. 25, 1973, describes an automatic transversal filter for use in phase-modulated data transmission systems, wherein the error signal is derived from the equalized signal envelope amplitude.

This amplitude is measured at sampling instants determined by a clock and is compared with a reference amplitude to generate an envelope error signal. The error signal that permits to adjust the equalizer is obtained by multiplying the envelope error signal by the equalizer output signal.

Such an equalizer has several drawbacks. As is well known, the detection of a signal envelope requires a frequency field transfer; that is, the signal must be modulated by a frequency generated by a local oscillator. The equipment commonly used at present to perform this modulation consists of essentially analog modulators; where a digital equalizer is used, a digital-to-analog converter must be provided to convert the equalizer output signal before transferring the frequency field. The need to use a modulator runs counter to the current trend toward the digitalization of the systems; in addition, digital-to-analog converters are generally expensive.

Another drawback of said equalizer is that the error signal is derived from the relative amplitude error as measured in the equalizer output signal envelope. In data transmission systems using the phase modulation technique, the linear distortions introduced in the data signals affect not only the amplitude of the signals, but also their phase. If the phase errors introduced by the transmission medium are ignored, the optimum adjustment of the equalizer will be relatively unaffected, the information obtained from the amplitude errors and that obtained from the phase errors being largely redundant, but the time required for said adjustment to reach its optimum value will be increased. As is known, the cost of using a data transmission medium essentially depends on the actual amount of data transmitted thereon. It is, therefore, desirable to enhance the efficiency of the transmission system by reducing its start time and, more particularly, by increasing the convergence speed of the equalizer; that is, by minimizing the time required for the optimum adjustment of the equalizer to be obtained.

OBJECTS OF THE INVENTION

Accordingly, it is the main object of the present invention to provide an improved method and apparatus which allow a phase-modulated electrical signal to be equalized with no frequency field transfer.

It is another object of the present invention to provide an improved method and apparatus for equalizing phase-modulated electrical signals, said apparatus exhibiting an extremely fast convergence.

BRIEF SUMMARY OF THE INVENTION

These and other objects are generally accomplished by the following method steps:

filtering the signal received from the transmission medium through a first transversal filter having a variable transfer function so as to obtain an equalized signal;

generating an adjustment error signal by comparing the output signal of said first transversal filter with a reference signal at characteristic instants determined by a clock that generates timing signals at the rate at which the data bits are transmitted; and adjusting the transfer function of said first transversal filter in such a way as to minimize said adjustment error signal.

The adjustment error signal is characterized in that the step of generating said adjustment error signal includes the steps of:

extracting the carrier frequency from the signal received from the transmission medium;

generating from the extracted carrier frequency n possible reference signals, where n represents the number of distinct values which the transmitted data signal can assume, each of said possible reference signals consisting of said extracted carrier frequency exhibiting one of said n distinct phase values;

selecting from said possible reference signals the particular one which is to be used as reference signal at a given characteristic instant; and comparing the output signal of said first transversal filter with said particular reference signal to be used at a given characteristic instant.

According to another aspect of the invention, the method further includes the steps of:

filtering the signal in quadrature with the signal received from said transmission medium through a second transversal filter identical with said first transversal filter; and generating said adjustment error signal by comparing the output signal of said first transversal filter with said reference signal; and by comparing the output signal of said second transversal filter with a signal in quadrature with said reference signal.

According to a more particular aspect of the invention, the selection of said refernce signal and said signal in quadrature therewith includes the steps of:

determining from said extracted carrier frequency n sectors within which said n possible reference signals are present;

comparing a signal representative of the output signals of said first and second transversal filters with said *n* sectors;

selecting as reference signal the one of said n possible reference signals which is present within the sector in which said representative signal is present; and selecting the signal which is in quadrature with the selected reference signal.

The invention also includes an apparatus embodying the method, including:

an input from the transmission medium;

a first transversal filter with variable coefficients, the input of said filter being connected to said input;

phase conversion means to generate an output signal in quadrature, said input signal being applied thereto;

a second transversal filter identical with said first transversal filter, the input of said second filter being connected to the output of said phase conversion means;

carrier frequency extraction means whose input is connected to said input terminal;

a phase-locked oscillator whose input is connected to the output of said carrier frequency extraction means, to provide the extracted carrier frequency exhibiting said n possible phase values, the *n* signals supplied by said oscillator being the *n* possible reference signals, and the *n* signals in quadrature with said n possible reference signals, respectively;

a clock used to determine the characteristic instants;

selection means to select from said $n$ possible reference signals the particular reference signal to be used at a given characteristic instant and to further select a signal in quadrature with the selected reference signal;

gating means connected to said oscillator and said selection means to provide said selected reference signal and said signal in quadrature therewith;

first comparison means to compare the signal obtained at the output of said first transversal filter with the selected reference signal;

second comparison means to compare the signal obtained at the output of said second transversal filter with the signal in quadrature with the selected reference signal;

first correlation means connected to the taps of said first transversal filter and to the output of said first comparison means; and second correlation means connected to the taps of said second transversal filter and to the output of said second comparison means, the signals provided by said first and second correlation means comprising said adjustment error signal.

The foregoing and other objects, features and advantages of the invention will be apparent from the more particular description of a preferred embodiment thereof, as illustrated in the accompanying drawings.

Figure 1:
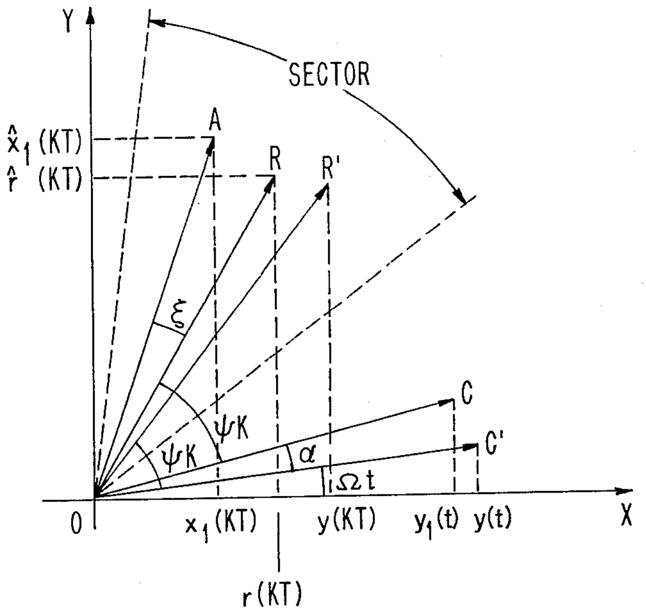
FIG. 1 is a Fresnel diagram intended to facilitate understanding of the present invention.

The present invention relies upon the analysis of the exact nature of the error which a phase-modulated data signal may exhibit when it reaches the receiving end of a transmission link. For clarity, the so-called Fresnel diagram shown in FIG. 1 will be used to illustrate the principles of the phase-modulated method. In the absence of any modulation, the carrier frequency $y(t)$ generated at the instant $t$ can be written:

$$y(t) = So \cos \Omega t \quad (1)$$

where $\Omega$ represents the angular frequency of the carrier frequency. In the Fresnel diagram, this carrier frequency can be represented by a vector $\overrightarrow{OC'}$ whose projection on axis OX is equal to $y(t)$ as defined in expression (1).

As previously mentioned, in phase modulation the phase of the carrier frequency is made to shift at the characteristic instants, each shift $\phi$ being representative of one or more data elements. Let $\phi_k$ represent the phase shift at the characteristic instant $t=KT$ (where $K$ is a positive integer and $T$ is the period of the characteristic instants). At $t=KT$ the carrier frequency $y(KT)$ can be written:

$$y(KT) = So \cos (\Omega\, KT + \phi_k). \quad (2)$$

The carrier frequency y(KT) can be represented in the Fresnel diagram by the vector $\overrightarrow{OR'}$. Taking into consideration the distortions introduced by the transmission medium, the corresponding signal obtained at the receiving end of the transmission link can be represented by a vector $\overrightarrow{OR}$ whose phase and amplitude differ from those of vector $\overrightarrow{OR'}$. The purpose of the equalizer is to correct this discrepancy in order that the data may be properly detected. Since the receiver has no sense of vector $\overrightarrow{OR'}$, the generator must generate locally a reference signal which should be as close as possible to the signal represented by vector $\overrightarrow{OR'}$, then miminize the difference between this reference signal and the signal being received.

In accordance with the invention, the reference signal is generated using the unmodulated carrier frequency extracted from the received signal.

The unmodulated carrier frequency extracted from the received signal initially exhibits a phase shift $\phi$ introduced by the transmission medium and can be written:

$$yl(t) = S \cos (\Omega t + \phi) \quad (3)$$

where $S$ is the amplitude $So$ of the signal $y(t)$ (expression (1) above) as distorted by the transmission medium. Frequency $yl$(t) can therefore be represented in the Fresnel diagram by the vector $\overrightarrow{OC}$. Thus, the unmodulated carrier frequency $yl$(t) being available and the respective values of the possible phase shifts $\phi$ used for data transmission being known a priori, it becomes possible to generate locally the extracted carrier frequency exhibiting phase shifts $\phi$. However, it is necessary to select from all possible reference signals thus generated the particular reference signal, $r$(KT), which will have to be used at the characteristic instant $t=KT$. According to the invention, the latter reference signal is selected by defining, from vector $\overrightarrow{OC}$ representing frequency $yl$(t), a number of sectors within each of which vectors representative of the reference signals are located and by determining in which sector is located the vector $\overrightarrow{OA}$ representative of the signal received at the characteristic instant $t=KT$. Once this particular sector has been determined, the vector representative of the reference signal present within this sector is selected as reference vector $\overrightarrow{OR}$.

In the diagram of FIG. 1, the sector in which reference vector $\overrightarrow{OR}$ is located at the characteristic instant $t=KT$ is shown in broken lines.

The selected reference signal $r$(KT) will next be used for the purposes of the equalization proper. Many different methods can be used to this end; in this connection, reference may be made to the aforementioned book by R. W. Lucky et al., pages 128–165, and to an article entitled, "A Simple Adaptive Equalizer for Efficient Data Transmission," by D. Hirsch and W. J. Wolf, in Wescon Technical Papers, Part IV, Section 11.2, 1969, published by Wescon IEEE.

In the preferred embodiment of the invention, the chosen criterion is to minimize the mean-square error $E=\overline{AR^2}$ by considering vector $\overrightarrow{OR}$ as representing the signal $xl$(KT) obtained at the output of the equalizer. It should be noted that the horizontal bar over $AR^2$ indicates the time average of this expression. Error E is evaluated by taking advantage of the fact that vector $\overrightarrow{OR}$ is fully defined by the reference signal $r$(KT) and the signal in quadrature therewith, $\hat{r}$(KT), and the vector $\overrightarrow{OA}$ is fully defined by the signal $\hat{x}l$(KT) and the signal in quadrature therewith, $xl$(KT).

Error $E$ can be defined as follows:

$$E = (xl(KT) - r(KT))^2 + (\hat{x}l(KT) = \hat{r}(KT))^2 \quad (4)$$

Error $E$, as defined above, is used by the equalizer shown in FIG. 2, which will now be described.

Figure 2:
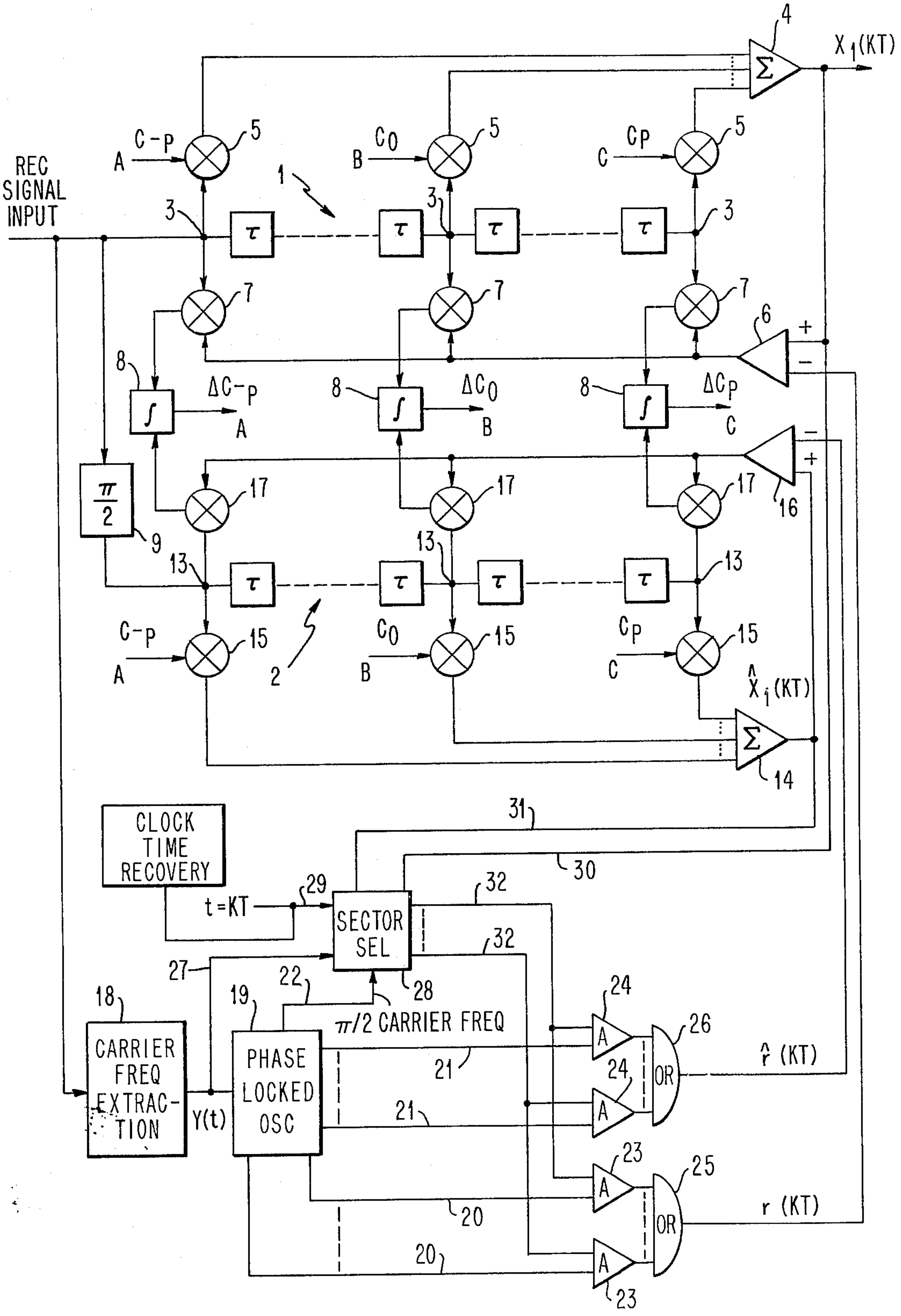
FIG. 2 shows by way of example an embodiment of the equalizer of the present invention.

The device of FIG. 2, essentially consists of two transversal filters having variable coefficients, that is, two transversal equalizers built around two delay lines 1, 2, and a reference signal generator. The basic principles of a transversal equalizer are described in the previously cited work by R. W. Lucky et al., pages 128–165. The specific implementation of each of the two transversal equalizers just mentioned is described in the section headed "Mean-Square" of the article by Hirsch and Wolf referred to earlier.

The signal received from the transmission medium is applied to the input of delay line 1. This delay line comprises a set of $2p + 1$ taps 3 mutually separated by a delay $\tau$ whose value is conventionally made lower than or equal to the reciprocal of the Nyquist frequency, which is equal to twice the value of the highest frequency being transmitted. The length of the delay line is also determined conventionally by making a compromise between the performance and the cost of the device. The taps 3 are connected to the output of the equalization system through a summing device 4 which provides the signal $xl$(KT) at the characteristic instant $t=KT$.

Multipliers 5 with variable coefficients $C$-$p$, . . . , $Co$, . . . , $Cp$ are interposed between the taps 3 and the summing device 4. The multipliers 5 may consist of any appropriate device well-known to those skilled in the art, and the value of the coefficients can be adjusted either electrically or mechanically. The signal $xl$(KT) generated by the summing device 4 is fed to the (+) input of a subtractor 6 whose output is connected to an input of each of $2p$+1 multipliers 7. The other input of each of the multipliers 7 is connected to one of the taps 3, respectively. The output of each multiplier 7 is applied to one of $2p$+1 integrators 8. The output of each integrator 8 is in turn applied to a multiplier coefficient adjustment means (not shown) which may be either electrical or mechanical as previously stated. The output of a given integrator 8 through its respective multiplier coefficient adjustment means controls the adjustment of the coefficient of the multiplier 5 which is connected to the tap 3 to which that integrator is itself connected.

The signal received from the transmission medium is also applied to the input of a phase conversion means 9, such as a Hilbert transformer, which generates a signal in quadrature with the input signal applied thereto. The signal generated by phase conversion means 9 is fed to the input of delay line 2, which is identical with delay line 1 and comprises $2p$+1 taps 13. Taps 13 are connected to the inputs of a summing device 14 via $2p$ +1 variable coefficient multipliers 15 identical with multipliers 5. The respective coefficients of multipliers 15 are made equal to those of multipliers 5 by the same means of integrators 8. The output signal $\hat{x}l$(KT) generated by the summing device 14 is applied to the (+) input of a subtractor 16 whose output is connected to an input of each of $2p$+1 multipliers 17 identical with multipliers 7. The other input of each of the multipliers 17 is respectively connected to another input of one of the integrators 8, whose output controls the adjustment of the coefficient of the multiplier 15 that is connected to the tap 13 to which the integrator is itself connected.

The signal received from the transmission medium is also fed to the input of a carrier frequency extraction device 18. Device 18 is conventionally used in the coherent or fixed-phase method of demodulation (or detection) and is mainly comprised of a frequency divider and a multiplication circuit serving to multiply the received signal by the phase differential between two consecutive phase values which the carrier frequency may assume. The output of device 18 is connected to the input of a phase-locked oscillator 19 which provides the possible reference signals on its output lines 20, signals in quadrature with these reference signals on its output lines 21, and the extracted carrier frequency exhibiting a $\pi/2$ change in phase on its output line 22. Output lines 20 are respectively connected to one of the inputs of an AND gate 23, and output lines 21 are respectively connected to one of the inputs of an AND gate 24. The outputs of AND gates 23 and 24 are connected to the inputs of OR gates 25 and 26, respectively. The output of device 18 is also connected via line 27 to one of the inputs of a sector selection device 28, which will be described later. Device 28 also receives via line 29 clock signals defining the characteristic instants $t=KT$ from a clock recovery circuit (not shown), an example of which is described in the CCITT contribution referenced COM Sp.A No. 143, USSR, Oct., 1963, Vol. VIII, question 1-A, item Z, pages 4–12. Two additional inputs of device 28 are connected to summing devices 4 and 14 via lines 30 and 31, respectively. Device 28 is provided with a number of output lines 32 equal to the number of possible reference signals, and each output line 32 is connected to the other input of one of the AND gates 23 and 24. The outputs of OR gates 25 and 26 are connected to the (−) inputs of subtractors 6 and 16, respectively.

The operation of the system illustrated in FIG. 2 will now be described. The equalization of the received signal, using reference signals $r$(KT) and $\hat{r}$(KT), will first be dealt with. The manner in which these reference signals are obtained will then be described.

As mentioned earlier, the chosen equalization criterion is to minimize the mean-square error E as defined in Eq. (4). Since the only adjustable elements which may be acted upon to complete the equalization process are the values of coefficients $Cj$, where $j$=−$p$, . . . , +$p$, the value of error E will be minimal if the derivative of E with respect to the various coefficients is equal to zero; that is, if $$\frac{\delta E}{\delta C_j} = O \text{ for } j{=}{-p}, \ldots, {+p}. \quad (6)$$

According to Eq. (4)

$$\frac{\delta E}{\delta C_j} = 2 \; \frac{\delta[xl(KT) - r(KT)]}{\delta Cj} [xl(KT) - r(KT)] + [xl(KT - r(KT)]$$

$$2 \; \frac{\delta[xl(\hat{K}T) - r(\hat{K}T)]}{\delta Cj} \quad (7)$$

Consequently, the values of coefficients Cj must be adjusted such that:

$$\frac{\delta[xl(KT)-r(KT)]}{\delta Cj}[xl(KT)-r(KT)] + \frac{\delta[\hat{x}l(KT)-\hat{r}(KT)]}{\delta Cj}[\hat{x}(KT)-\hat{r}(KT)] = 0 \quad (8)$$

for $j=-p, \ldots, +p$.

Since signals $r(KT)$ and $\hat{r}(KT)$ are independent of the values of coefficients $Cj$, Eq. (8) can be written $$\frac{\delta xl(KT)}{\delta Cj}[xl(KT)-r(KT)] + \frac{\delta \hat{x}l(KT)}{\delta Cj}[xl(KT)-\hat{r}(KT)] = 0 \quad (9)$$

Referring to FIG. 2 and using the central taps ($Co$) as the origin of the delays in delay line 1, we can write $$xl(KT) = C_{-p} \times (KT+P_\tau) + \ldots + Co\, x(KT) + \ldots + C_p \times (KT-P_\tau) \quad (10)$$

hence $$\frac{\delta xl(KT)}{\delta Cj} = x(KT-j_\tau) \text{ for } j=-P, \ldots, +P \quad (11)$$

Similarly, we obtain $$\frac{\delta \hat{x}l(KT)}{\delta Cj} = \hat{x}(KF-j_\tau) \text{ for } j=-P, \ldots, +P \quad (12)$$

Equation (9) then becomes $$x(KT-j_\tau)[xl(KT) - r(KT)] + \hat{x}(KT-j_\tau)[\hat{x}l(KT) - \hat{r}(KT)] = 0 \quad (13)$$

It is therefore necessary to complete the equalization process, to adjust the values of coefficients $Cj$ in such a way that Eq. (13) will be satisfied for $j=-p, \ldots, +p$.

As explained below, Eq. (13) is used by the device illustrated in FIG. 2 for clarity, the following discussion will be limited to the adjustment of the value of coefficient $Cp$, which as shown in the figure, is associated with the last taps ($C_p$) of delay lines 1 and 2.

The signals $xl(KT)$ and $r(KT)$ respectively provided by the summing device 4 and the OR gate 25 are fed to the (+) and (−) inputs, respectively, of subtractor 10, which provides the value of the difference $[xl(KT) - r(KT)]$.

This value is applied to one of the inputs of a multiplier 7, the other input of which is connected to the tap 3 considered. The signal present on this tap being $x(KT-P_\tau)$, this multiplier 7 generates the product $x(KT-P_\tau)[xl(KT)-r(KT)]$ which is applied to the input of an integrator 8. Similarly, the signals $\hat{x}l(KT)$ and $\hat{r}(KT)$ provided by the summing device 14 and the OR gate 26, respectively, are applied to the (+) and (−) terminals, respectively, of subtractor 16, which provides the value of the difference $[\hat{x}l(KT)-\hat{r}(KT)]$. This value is applied to one of the inputs of a multiplier 17 the other input of which is connected to the tap 13 considered. The signal present on this tap being $\hat{x}(KT-P_\tau)$, multiplier 17 provides the product $\hat{x}(KT-P_\tau)[\hat{x}l(KT)-\hat{r}(KT)]$ which is applied to the input of integrator 8.

Integrator 8 provides at its output the mean square of the sum $$x(KT-P_\tau)[xl(KT)-r(KT)] + \hat{x}(KT-P_\tau)[xl(KT)-\hat{r}(KT)]$$

whose value is used to adjust that of coefficient $Cp$ until said sum is equal to zero, thereby ensuring the equalization of the received signal.

The manner in which the device illustrated in FIG. 2 generates the reference signals $r(KT)$ and $\hat{r}(KT)$, as defined above, will now be described by reference to FIG. 1.

The received signal is fed to device 18 which extracts the carrier frequency $yl(t)$ therefrom. The extracted carrier frequency $yl(t)$ corresponds to vector $\overrightarrow{OC}$ shown in FIG. 1 and is applied to the input of the phase-locked oscillator 19, which then provides on each of its output lines 20 frequency $yl(t)$ exhibiting one of the possible phase shifts, i.e., one of the possible reference signals. It is then necessary to select from the reference signals available on output lines 20 the particular one which will be used as reference signal at the characteristic instant $t=KT$, and also the corresponding quadrature signal available on one of the output lines 21. These selections are made by the sector selection device 28, which has three functions.

First, device 28 reconstructs the different sectors, as defined above, from the extracted carrier frequency $\hat{y}l(t)$ and the signal $yl(t)$ in quadrature therewith which are applied to the device via lines 27 and 22, respectively. In addition, device 28 detects the phase of the signal present at the output of the equalizer from the signals $xl(KT)$ and $xl(KT)$ which are applied to the device via lines 30 and 31, respectively, at the characteristic instant $t=KT$ determined by the clock signals present on line 29. Lastly, device 28 determines the sector in which the equalizer output signal is present at $t=KT$ and activates the particular output line 32 which corresponds to the reference signal to be used. This line 32 activates the AND gate 23 to which it is connected and causes the reference signal $r(KT)$ which will be used at $t=KT$ to be conveyed from the line 20 on which it is available to the output of OR gate 25. The activated line 32 also causes the corresponding quadrature signal $\hat{r}(KT)$ available on line 21 to be conveyed to the output of OR gate 26.

Figure 3:
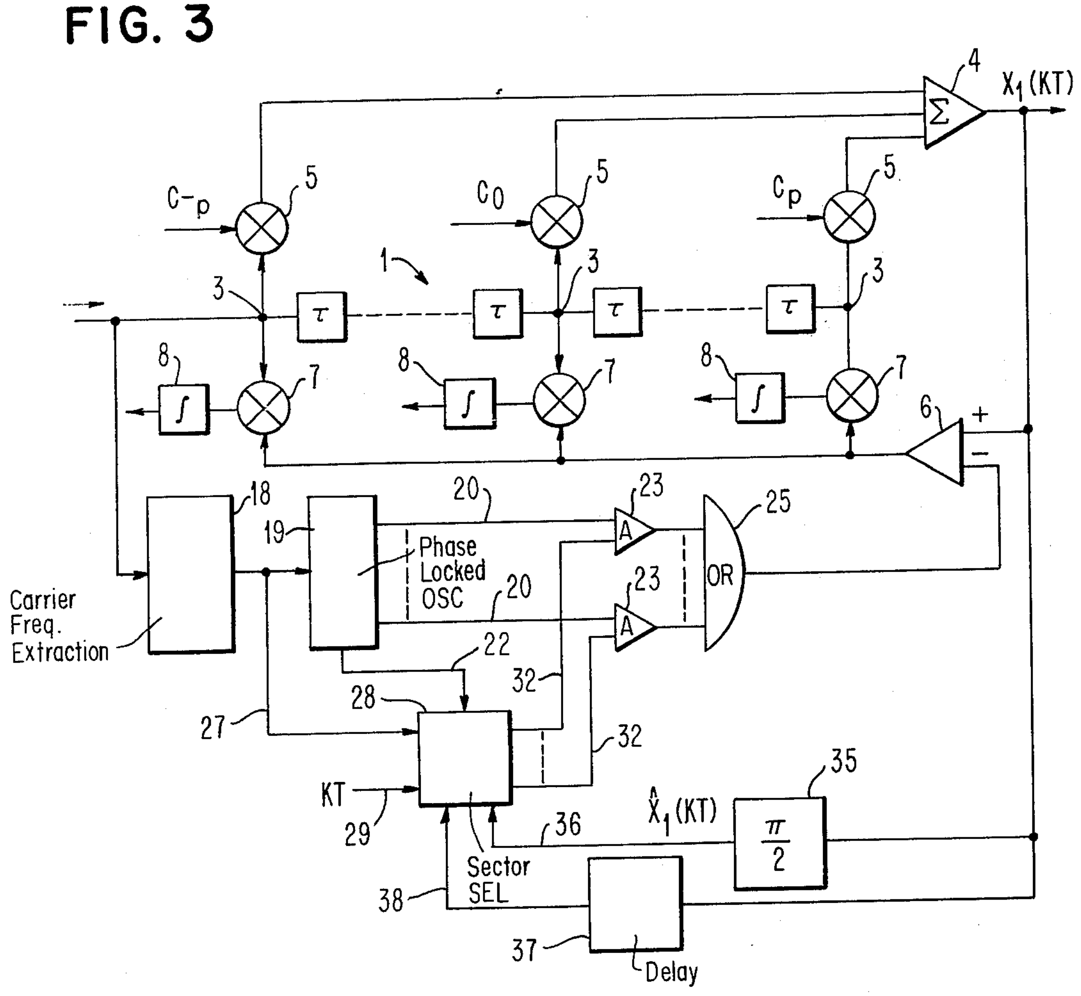
FIG. 3 illustrates a simpler version of the embodiment of FIG. 2.

FIG. 4$a$ illustrates the sector selection device 28 of FIGS. 2 and 3, in the case of a data transmission system in which the phase of the carrier frequency can assume four discrete values $$\phi 1 = \frac{\pi}{4};\ \phi 2 = \frac{3\pi}{4};\ \phi 3 = \frac{5\pi}{4} \text{ and } \phi 4 = \frac{7\pi}{4}.$$

For clarity, the diagram shown in FIG. 4$b$, which diagram is similar to that of FIG. 1, will be used to illustrate the operation of device 28.

Figure 4A:
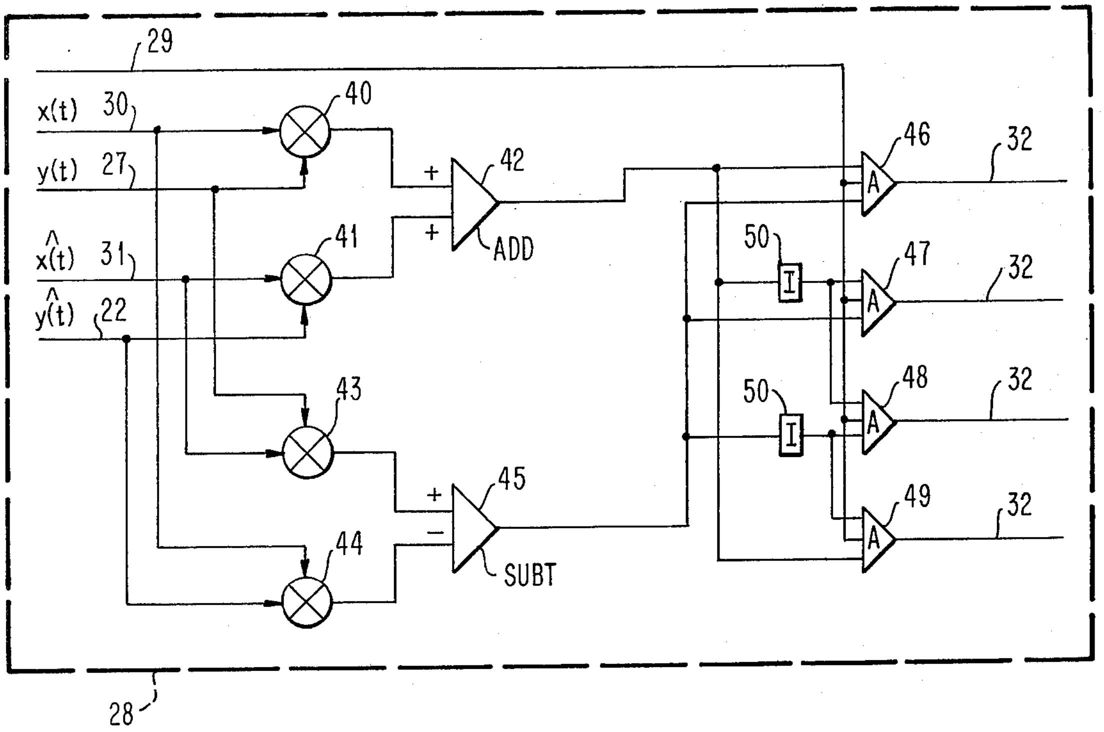
FIG. 4*a* illustrates a sector selection device used in the present invention.
Figure 4B:
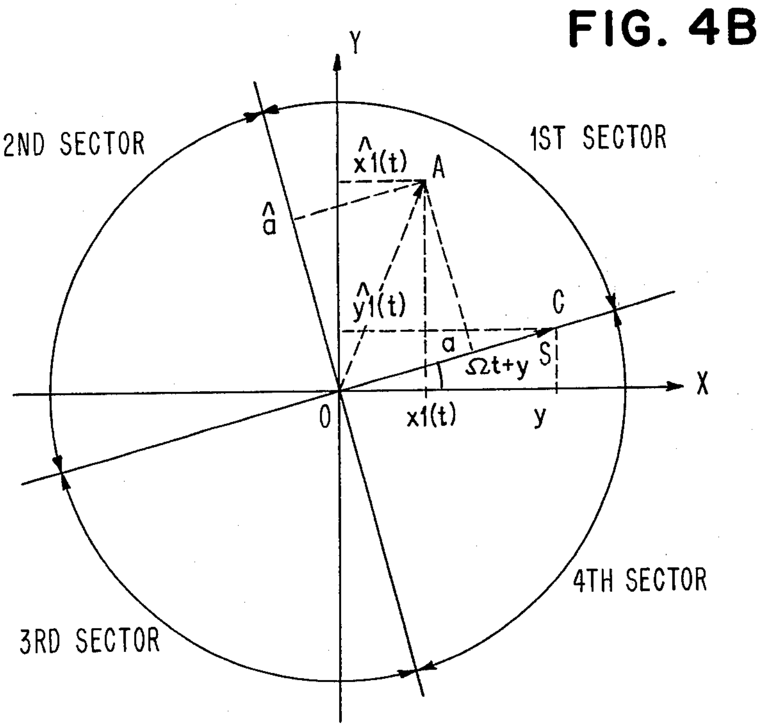
FIG. 4*b* illustrates the operation of the circuitry in FIG. 4*a*.

The four sectors, within each of which the vector representative of the reference phases $\phi 1 - \phi 4$ is located, are the four quadrants delimited by the rectangular coordinate axes which are defined by the vector $\overrightarrow{OC}$ representative of the extracted carrier frequency $yl(t)$, as illustrated in FIG. 4b.

As mentioned earlier, device 28 must determine in which sector is located the vector $\overrightarrow{OA}$ representative of the received signal. This is done by using the coordinates $a$ and $\hat{a}$ of vector $\overrightarrow{OA}$ in said rectangular coordinate axes.

As illustrated in the diagram of FIG. 4*b*, if $a > 0$ and $\hat{a} > 0$, $\overrightarrow{OA}$ is in the first sector
$a < 0$ and $a > 0$, $\overrightarrow{OA}$ is in the second sector
$a < 0$ and $\hat{a} < 0$, $\overrightarrow{OA}$ is in the third sector $a > 0$ and $\hat{a} < 0$, $\overrightarrow{OA}$ is in the fourth sector The coordinates $a$ and $\hat{a}$ are derived from $\hat{x}l(t)$ and $xl(t)$ by using the conventional axis rotation formulas (ref.: Handbook of Mathematical Tables and Formulas, R. S. Burington, McGraw-Hill Book Co., page 35) which yield:

$$a = xl(t)\cos(\Omega t + \phi) + \hat{x}l(t)\sin(\Omega t + \phi)$$

(18)

$$\hat{a} = \hat{x}l(t)\cos(\Omega t + \phi) - xl(t)\sin(\Omega t + \phi)$$

By multiplying each term of equations (18) by S, which is the amplitude of the extracted carrier frequency (ref. equation (3), equations (18) become $$a \cdot S = xl(t)\,S\cos(\Omega t + \phi) + \hat{x}l(t)\,S\sin(\Omega t + \phi)$$

(19)

$$a \cdot S = \hat{x}l(t)\,S\cos(\Omega t + \phi) - xl(t)\,S\sin(\Omega t + \phi)$$

According to equation (3), we can write $$a \cdot S = xl(t)\,yl(t) + \hat{x}l(t)\,\hat{y}l(t)$$

(20)

$$\hat{a} \cdot S = \hat{x}l(t)\,yl(t) - xl(t)\,\hat{y}l(t)$$

Amplitude S being a positive quantity, the signs of $\hat{a} \cdot S$ and $\hat{a} \cdot S$ are the same as those of $a$ and $a$, respectively.

Accordingly, the sign of quantities $U = a \cdot S$ and $V - \hat{a} \cdot S$ will determine in which sector the vector $\overrightarrow{OA}$ is located.

Device 28 illustrated in FIG. 4a essentially consists of computing means for deriving the sign of U and V from $\hat{x}l(t)$, $xl(t)$, $yl(t)$ and $\hat{y}l(t)$, and logic means for determining in which sector the vector $\overrightarrow{OA}$ is located, according to the sign of U and V.

The signal $xl(t)$ on line 30 and the signal $yl(t)$ on line 27 are applied to the inputs of a multiplier 40 whose output provides the product $xl(t) \cdot yl(t)$. Similarly, the signal $\hat{x}l(t)$ on line 31 and the signal $\hat{y}l(t)$ on line 22 are applied to the inputs of a multiplier 41 whose output provides the product $\hat{x}l(t) \cdot \hat{y}l(t)$. The outputs from multipliers 40 and 41 are applied to the inputs of a summing device 42 which forms the sum $U = xl(t) \cdot yl(t) + \hat{x}l(t) \cdot \hat{y}l(t)$. The output of device 42 only provides the sign of U from which the logic means derive the location of vector $\overrightarrow{OA}$.

Likewise, the signals $\hat{x}l(t)$ and $yl(t)$ are applied to the inputs of a multiplier 43 whose output provides the product $\hat{x}l(t) \cdot yl(t)$, and the signals $xl(t)$ and $\hat{y}l(t)$ are applied to the inputs of a multiplier 44 whose output provides the product $xl(t) \cdot \hat{y}l(t)$. The output from multipliers 43 and 44 are applied to the inputs (+) and (−) of a subtractor 45, respectively. The output of subtractor 45 provides the sign of V. The signals representing the signs of U and V are applied to a set of AND gates 46–49 whose outputs indicate in which sector the vector $\overrightarrow{OA}$ is located. The outputs from devices 42 and 45 are applied to the inputs of AND gate 46. Assuming that the output signal from devices 42 and 45 are at an "up" level when both the signs of U and V are positive, an "up" level at the output of AND gate 46 will indicate that vector $\overrightarrow{OA}$ is in the first sector. The output from device 42 through an inverter 50 and the output of device 45 are both applied to the inputs of AND gate 47. An "up" level at the output of AND gate 47 will indicate that vector $\overrightarrow{OA}$ is in the second sector. The output from inverter 50 and the output, through an inverter 51, from device 45 are applied to the inputs of AND gate 48, so that an "up" level at the output of the latter will indicate that vector $\overrightarrow{OA}$ is in the third sector. The output from inverter 51 and the output from device 42 are applied to the inputs of AND gate 49, so that an "up" level at the output of the latter will indicate that vector $\overrightarrow{OA}$ is in the fourth sector.

Each of the AND gates 46–49 also receives via line 29 clock signals defining the characteristic instants $t = KT$.

The outputs from AND gates 46–49 are applied via lines 32 to AND gates 23 and 24 in FIGS. 2 and 3, and control the gating of the proper reference signals $r(KT)$ and $\hat{r}(KT)$ to devices 6 and 16, respectively in FIGS. 2 and 3.

It should be noted that, while the equalizer illustrated in FIG. 2 comprises two transversal filters with variable coefficients, a single time-multiplexed transversal filter could be used in accordance with current techniques.

The arrangement shown in FIG. 2 may be simplified by eliminating the transversal filter to which the signal in quadrature with the received signal is applied, i.e., the transversal equalizer built around delay line 2. In that case, the error to be minimized would no longer be error E as defined by Eq. (4), i.e., $$E = \overline{[xl(KT) - r(KT)\,^2 + \hat{x}l(KT) = \hat{r}(KT)]^2}$$

(4)

but error $E'$ *defined by*

$$E' = \overline{[xl(KT) - r(KT)]^2}$$

(14)

FIG. 3 illustrates an equalizer designed to minimize error $E'$ *as defined by Eq.* (14). For clarity, the same reference numerals have been used to identify those components which are common to the arrangements of FIGS. 2 and 3.

The equalizer of FIG. 3 includes a single transversal equalizer built around delay line 1 and identical with that illustrated in FIG 2, and a device to generate the reference signals $r(KT)$ which is slightly different from that shown in FIG. 2.

As in the case of the arrangement of FIG. 2, the only adjustable elements are the values of coefficients $Cj -p, \ldots, +p$, so that the value of error E' will be minimal if $$\frac{\delta E'}{\delta Cj} = 0 \text{ for } j = -p, + \ldots, +p$$

According to Eq. (14)

$$\frac{\delta E'}{\Delta Cj} = 2\,\frac{\delta[xl(KT) - r(KT)}{\delta Cj}\,[xl(KT) - r(KT)]$$

(15)

-Continued

As has been seen, Eq. (15) can be written $$\frac{\delta E'}{\delta Cj} = 2\, x\, (KT-j_{\tau})\, [xl(KT)-r(KT)] \qquad (16)$$

Accordingly, the values of coefficients Cj must be adjusted such that $$x(KT-j_{\tau})\ [xl(KT)-r(KT)] = 0 \text{ for } j=-p, \ldots, +p. \qquad (17)$$

The use of Eq. (17) by the device of FIG. 3 for the purposes of the equalization can readily be verified by reference to the previous discussion in connection with FIG. 2.

In the embodiment of FIG. 3, the only reference signals used are signals $r$(KT), the generation of which will now be described.

The received signal is applied to the device 18, which extracts the carrier frequency $yl(t)$ therefrom.

Carrier frequency $yl(t)$ is applied to the phase-locked oscillator 19, which provides on output lines 20 the n possible reference signals. The particular reference signal to be used at the characteristic instant $t$=KT is selected by the sector selection device 28 which activates one of the output lines 32 to allow that signal to be conveyed to the output of OR gate 25.

The only difference between the reference signal generation devices of FIGS. 2 and 3 is that, in the arrangement of FIG. 3, only the equalizer output signal $xl$(KT) is available, so that the quadrature signal $\hat{x}l$(KT) must be reconstructed, both signals being necessary in order for the device 28 to determine vector $\overrightarrow{OA}$. Quadrature signal $\hat{x}l$(KT) is obtained by applying signal $\hat{x}l$(KT), which appears at the output of summing device 4, to a phase conversion means 35, which may consist of a Hilbert transformer. Signal $xl$(KT) is then applied to the sector selection device 28 via line 36. To ensure that signal $\hat{x}l$(KT) is in phase with signal $xl$(KT), a delay element 37 is interposed between the output of summing means 4 and device 28. The delay introduced by element 37 is made equal to the delay introduced by phase conversion means 35. The output of element 37 is applied to device 28 via line 38.

The simplification brought about by the device of FIG. 3 results in the convergence speed being reduced by a factor of 2.5.

Where the amount of distortion of the received signals is 20 percent, convergence is achieved within a time interval equivalent to 400–600 periods T with the device of FIG. 2 and within about 2,000 periods T using the simplified device of FIG. 3.

While the invention has been shown and described with reference to a particular embodiment thereof, it will be understood by those skilled in the art that the foregoing and other changes in form and detail may be made therein without departing from the spirit and scope of the invention.

What is claimed is:

1. A method for equalizing a phase-modulated data signal, which may assume n distinct phase values as transmitted over a transmission medium that introduces linear distortions into the transmitted signals, comprising the steps of:

applying the signal received from the transmission medium to a first transversal filter having a variable transfer function and a plurality of different delay taps, thereby obtaining an equalized signal;

generating an adjustment error signal by comparing the output signal of said first transversal filter with a reference signal at characteristic instants defined by a clock which generates timing signals at the rate at which the data are transmitted; and adjusting said transfer function of said first transversal filter so as to minimize said adjustment error signal;

said adjustment error signal generating step including the steps of extracting the carrier frequency from the signal received from the transmission medium;

generating from said carrier frequency n possible reference signals, each of which consists of said extracted carrier frequency exhibiting one of said n distinct phase values;

selecting from said n possible reference signals the particular one which is to be used as a reference signal at a given characteristic instant; and comparing said first transversal filter output signal with the selected reference signal.

2. The method as described in claim 1, further comprising the steps of:

generating from said extracted carrier frequency a signal in quadrature with the signal received from the transmission medium;

passing said signal in quadrature with the signal received from the transmission medium through a second transversal filter identical with said first transversal filter; and generating said adjustment error signal by comparing the output signal of said first transversal filter with said reference signal, and the output signal of said second transversal filter with a signal in quadrature with said reference signal.

3. The method of claim 2, wherein:

said step of generating said adjustment error signal further includes the generation, using said extracted carrier frequency, of $n$ signals in quadrature with said $n$ possible reference signals; and a step of selecting from said $n$ signals in quadrature the particular one which is to be used at a given characteristic instant.

4. A method as described in claim 1, wherein:

said step of selecting said reference signal to be used at said given characteristic instant includes the steps of:

determining from said extracted carrier frequency n sectors within which said $n$ possible reference signals are present;

comparing a signal representative of said first transversal filter output signal and a signal representative of a signal in quadrature with said output signal with said $n$ sectors; and selecting as a reference signal the particular one of said $n$ possible reference signals which is in the sector within which said representative signal is present.

5. A method as described in claim 3, wherein:

said selection of said reference signal and said signal in quadrature therewith includes the steps of:

determining from said extracted carrier frequency $n$ sectors within which the possible reference signals are present;

comparing a signal representative of the output signals of said first and second transversal filters with said n sectors;

selecting as reference signal the particular one of said $n$ possible reference signals which is present in the sector within which said representative signal is present; and selecting the signal in quadrature with the selected reference signal.

6. A method as described in claim 1, wherein:

said generation of said adjustment error signal includes the steps of:

multiplying the result of the comparison of the output signal of said first transversal filter and said reference signal by each of the signals present on each of said different delay taps of said first transversal filter; and integrating the result of each multiplication, the integrated signal providing the adjustment error signal for the tap considered.

7. A method as described in claim 2, wherein:

said generation of said adjustment error signal further includes the steps of:

multiplying the result of the comparison of the output signal of said first transversal filter and said reference signal by each of the signals present on each of said different delay taps of said filter, the multiplication of said result by the signal present on the $n^{th}$ tap of said filter providing the $n^{th}$ partial result of a first type;

multiplying the result of the comparison of the output signal of said second transversal filter and said signal in quadrature with said reference signal by each of the signals present on each of said taps of said second transversal filter, the multiplication by the signal present on the $n^{th}$ tap of said second transversal filter providing the $n^{th}$ partial result of a second type; and integrating the sum of the $n^{th}$ partial result of the first type and the $n^{th}$ partial result of the second type, the result of this integration providing the adjustment error signal for the $n^{th}$ taps of said first and second transversal filters.

8. Phase equalizing apparatus, for data signal reception, comprising:

an input terminal;

a first transversal filter with $2p+1$ taps each of which has a variable gain coefficient, the input of said filter being connected to said input terminal and its output being connected to the output of said apparatus;

carrier frequency extraction means whose input is connected to said input terminal;

a phase-locked oscillator whose input is connected to the output of said carrier frequency extraction means to provie an extracted carrier frequency exhibiting $n$ possible phase values, the $n$ signals supplied by said oscillator making up $n$ possible reference signals;

a clock that determines the characteristic instants at the rate at which the data are transmitted;

selection means to select from said n possible reference signals the particular one to be used at a given characteristic instant;

gating means connected to said phase-locked oscillator and to said selection means to provide said selected reference signal to be used at a given characteristic instant;

first comparison means to compare the signal at the output of said first transversal filter with the selected reference signal provided by said gating means;

first correlation means connected to said taps of said first transversal filter and to the output of said first comparison means to provide an adjustment error signal; and means responsive to said adjustment error signal to vary the gain of said taps to minimize said error signal.

9. Apparatus as described in claim 8, wherein:

said selection means includes a sector selection device connected to said carrier frequency extraction means, to said phase-locked oscillator, to the output of said first transversal filter, to said clock and to said gating means, to determine in which of $n$ predefined sectors within which said $n$ possible reference signals are present the signal obtained at the output of said first transversal filter is available at the given characteristic instant, and to select as reference signal for said given characteristic instant the reference signal which is present in that sector.

10. Apparatus as described in claim 8, further comprising:

phase conversion means to generate an output signal in quadrature with the input signal applied thereto, the input of said phase conversion means being connected to said input terminal;

a second transversal filter identical with said first transversal filter, the input of said second filter being connected to the output of said phase conversion means;

second comparison means to compare the signal obtained at the output of said second transversal filter with a signal in quadrature with the reference signal, said signal in quadrature being provided by said phase-locked oscillator through said gating means; and second correlation means connected to the taps of said second transversal filter and to the output of said second comparison means to provide, in conjunction with said first correlation means, the adjustment error signal.

11. Apparatus as described in claim 10, wherein:

said selection means includes a sector selection device connected to said carrier frequency extraction means, to said phase-locked oscillator, to the outputs of said first and second transversal filters, to said clock and to said gating means, for determining in which of said $n$ predefined sectors a signal representative of the other signals of said first and second transversal filters is present at the given characteristic instant, for selecting as reference signal for said characteristic instant the one which is present in the sector thus determined, and for selecting the signal in quadrature with the reference signal thus selected.

12. Apparatus as described in claim 9, wherein:

said first and second transversal filters consist of a single time-multiplexed transversal filter.

* * * * *